Figure 1:
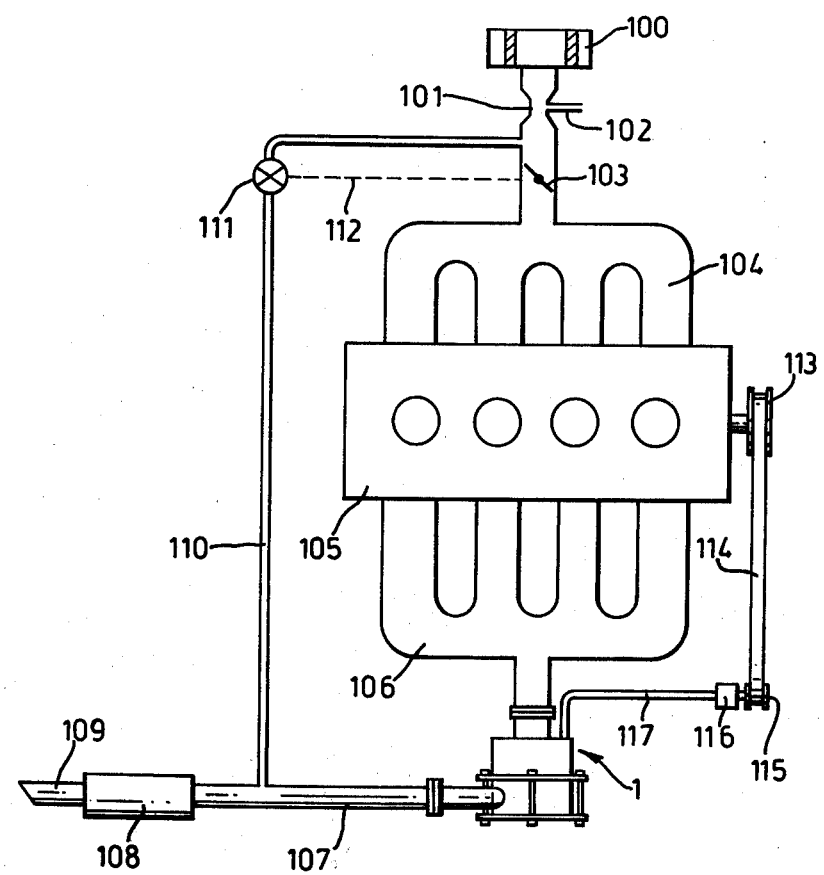

United States Patent [19]
Cocchiara et al.

[11] 3,986,840
[45] Oct. 19, 1976

[54] REACTOR ASSEMBLY FOR REDUCING AUTOMOTIVE POLLUTANT EMISSIONS

[75] Inventors: Franco Cocchiara; Remo Del Grosso, both of Rome, Italy

[73] Assignee: Exxon Research and Engineering Company, Linden, N.J.

[22] Filed: July 17, 1974

[21] Appl. No.: 489,367

[30] Foreign Application Priority Data
July 20, 1973   Italy.................................. 51581/73

[52] U.S. Cl............................. 23/288 F; 23/288 FB; 23/288 R; 208/146; 423/212; 423/213.7; 60/301; 60/278
[51] Int. Cl.².......................................... F01N 3/15
[58] Field of Search......... 23/288 F, 288 FB, 288 R; 208/146; 423/212 C, 213.7

[56] References Cited
UNITED STATES PATENTS

| | | | |
|---|---|---|---|
| 2,469,367 | 5/1949 | Burgess et al......................... | 23/281 |
| 3,429,656 | 2/1969 | Taylor et al. ............... | 23/288 FA X |
| 3,733,181 | 5/1973 | Tourtellotte et al. ............. | 23/288 F |
| 3,757,521 | 9/1973 | Tourtellotte et al. .......... | 23/288 F X |

*Primary Examiner*—James H. Tayman, Jr.
*Attorney, Agent, or Firm*—Joseph J. Dvorak

[57] ABSTRACT

A catalytic reactor assembly for purifying exhaust gas from internal combustion engine comprises a first bed of catalytic material which promotes reducing reactions in exhaust gas from the engine between unburned and partially burned fuel components and $NO_x$ whereby the latter is substantially converted to nitrogen and a second bed of catalytic material which promotes oxidizing reactions in the presence of added air to oxidize unburned and partially burned components of exhaust gas from the first bed. Exhaust gas is constrained to pass substantially radially outwards from the interior of the first bed to a collection space therearound and is then directed to the interior of the second bed for passage radially outwardly therethrough before discharge to atmosphere. The two catalytic beds are preferably cylindrical or annular, and located end-to-end for maximum conversions with minimum pressure drop. Baffle means are located between the catalytic beds for directing the exhaust gas from the collection space around the first bed to the interior of the second catalyst bed. Additionally, either the axis of the second bed is off-set from the axis of the first bed or the second bed has a non-uniform porosity so that there is a substantially constant pressure drop across any radial point in the second bed.

14 Claims, 3 Drawing Figures

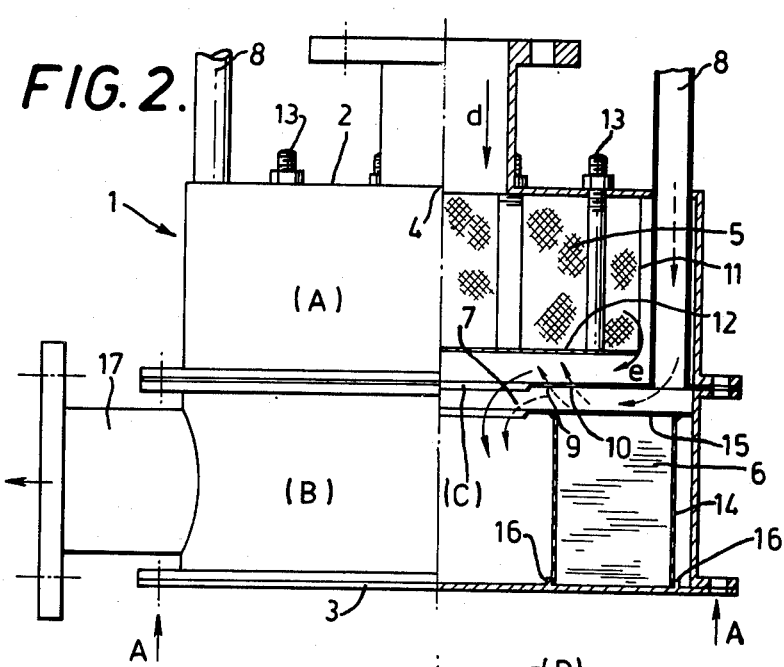
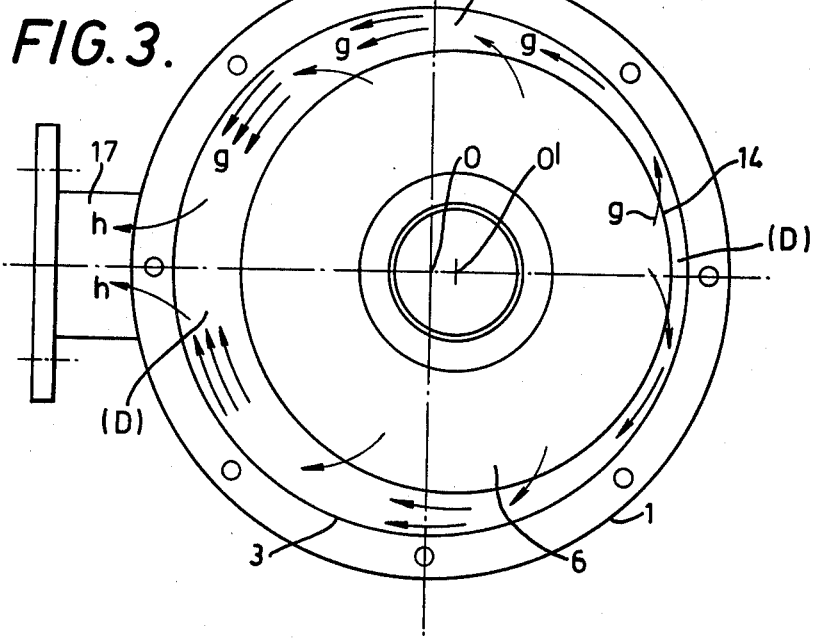

REACTOR ASSEMBLY FOR REDUCING AUTOMOTIVE POLLUTANT EMISSIONS

The present invention relates to reducing automotive pollutant emissions.

The problem of purifying the exhaust gases of internal combustion engines, e.g. of motor vehicles both of the nitrogenous components, mainly NO and of the unburnt and partially burnt components (CO, HC, etc) has acquired increasing importance up to now as a result of the greater attention paid to the study and elimination of the main causes of the pollution of the atmosphere and the obligation to comply with more or less stringent regulations, which are, or will be, enforced in most countries.

Proof of this increasing importance is the continuous effort being made at industrial level for the solution of this problem through the design and use of devices of different kinds for purifying the exhaust gases of internal combustion engines of motor vehicles.

Among these devices, considerable success has been attained in particular by devices in which are used in sequence catalysts with reducing and oxidising-promoting properties.

The embodiments that are at present provided for these latter types of device include (inter alia) catalytic reactors with two beds of catalyst, and with either (a) axial flow in both beds and axial discharge therefrom, or else (b) reactors of the so-called "bifurcated" type with mixed axial and radial flow as described, for example, in ASME paper No. 71029.

Both these types of reactor nevertheless display disadvantages which limit their efficacy for the conversion of the unburnt materials, such as in the first case (a), the inadequately satisfactory compactness due to the actual geometric configuration of the reactor, or the retardation in both cases (a), (b) of the operative starting time of the reactor resulting from the excessive time taken to attain the working temperature due to the relatively large dimensions and high surface area of the reactor body.

These drawbacks are eliminated, or are largely reduced in the solution provided by the present invention, in which the flow of gas through the two catalytic beds of the reactor and the discharge of gas from the reactor take place radially. Indeed, the arrangement of the catalytic beds according to the invention improves compactness, while the resulting reduced weight reduces the initial thermal inertia.

The present invention provides a reactor assembly for use in the purification of exhaust gases from an internal combustion engine comprising a first annular chamber for containing a reducing catalyst and a second annular chamber for containing an oxidizing catalyst, and means for constraining exhaust gas to pass first substantially radially outwardly from the interior of the first chamber and then substantially radially outwardly from the interior of the second chamber under oxidation promoting conditions.

The invention also comprises a method of purifying exhaust gases from an internal combustion engine comprising passing the gas substantially radially outwardly from the interior to the exterior of a first annular bed of catalyst under reduction-promoting conditions and then passing the gas from the first bed substantially radially outwardly from the interior to the exterior of a second annular bed of catalyst under oxidation promoting conditions.

The invention further provides a reactor assembly for use in the purification of exhaust gas from an internal combustion engine comprising two substantially cylindrical chambers arranged end-to-end with their adjacent ends spaced apart and surrounded by a lateral wall of cylindrical shape spaced apart from the outer walls of the chambers, the chambers being permeable to exhaust gas, an exhaust gas inlet disposed coaxially relative to the lateral wall at one end of the reactor adjacent the first chamber and arranged for directing exhaust gas to the interior of the first chamber whereby said gas will pass substantially radially through the first chamber to the space between the first chamber and the lateral wall, baffle means for directing exhaust gas from said space to the interior of the second chamber whereby said exhaust gas will pass substantially radially through said chamber into the space between the second chamber and the lateral wall, there being an exhaust outlet in the lateral wall adjacent to the other end of the reactor communicating with the space between the second chamber and the lateral wall for the discharge of exhaust gas from the reactor.

As against the two types of reactor at present adopted by technology, viz. those which provides reactors with all-axial flow, and those which provide reactors with mixed axial- and radial-flow, the reactor assembly of the present invention has considerable advantages.

Among these advantages, compared with the first of the two known types of reactor (axial flow reactors), the reactor of the invention with substantially all-radial gas flow through each of the chambers makes it possible to spread the flow of gas to be purified over a larger area of catalyst in each chamber so that for a given residence time in contact with the catalysts, the gases have lower velocities through the catalyst beds, a feature which ensures a better distribution of the flow and easier and more effective contact with the surface of the catalyst. Moreover, for equal volumes of catalysts in the prior axial flow reactor and the present reactor, the heating of each of the two beds takes place in shorter times in the reactor of this invention since the catalytic mass of the two beds is thermally insulated from the external wall of the reactor by the flow of gas emerging from, and surrounding, the said beds.

Moreover, because of the decreased velocity of gas through each chamber, there results less damage to catalysts, particularly pelletised catalysts from attrition between the particles of catalyst and a smaller pressure drop through each of the two beds.

Finally a more uniform distribution of temperatures is arrived at in both beds.

Compared with the second prior reactors ("bifurcated flow reactors") there is obtained with the reactor of the invention the benefit of a shorter time before each of the catalytic beds achieves its respective effective working temperature.

Additionally, the structure of the reactor is simpler and therefore less costly than previously proposed two-catalyst reactors.

Other advantages are those of ease of inspection of both catalyst beds, and improved versatility in that it is possible to employ the catalysts in any form (e.g., as pellets, mesh, or as the monolithic type, etc). It must also be added that the catalytic reactor of the invention has intrinsic advantages of outstanding merit.

In the first place, it is easier to improve the mixing of the secondary air with the gas emerging from the first catalytic bed (reducing bed). In practice this is carried out, as will be explained more clearly below, by adjusting the direction of the movement of the flow of secondary air so as to avoid remixing phenomena in the reducing bed, and by providing, immediately above the main mixing section, defined, e.g. between the upstream axial end of the second chamber and a baffle for directing exhaust gas into said chamber, a series of concentric drillings extending through the baffle whereby some secondary air is injected at right angles to the flow of gas from the first chamber, high turbulence pre-mixing being induced between the baffle and the adjacent axial end of the first chamber by the provision of these drilling or orifices in the baffle.

Furthermore, the geometry, described below, of the arrangement of the region of the reactor incorporating the second bed, makes it possible substantially to eliminate or diminish any lack of uniformity in pressure distribution in that region, and therefore to avoid, substantially, the creation of preferential paths. Moreover, in the reactor of the invention, it is possible to vary the volume of each of the two catalytic beds without thereby having to modify the external casing, a feature which enables the same reactor to be adapted to vehicles having engines of differing cylinder capacity.

Finally, the efficiency of the catalytic reactor of the invention presents definite improvements, as shown by some experimental observations, on the heating time and the counter-pressure at the exhaust. Indeed the pressure drop, in the case of a typical reactor of the present invention was found to be only 30 – 40 inches of water from the commencement of the U.S. federal test 1975, as against 180 – 200 inches of water observed for the "bifurcated" reactor under the same conditions of operation. The former pressure drop was found to be substantially identical with that found in the absence of the reactor (i.e. original discharge conditions), while, as is well known, with an axial flow catalytic reactor, there is an increase in the back-pressure in the exhaust system which is not insignificant. More specifically, the reactor assembly of the present invention is adapted to function as a catalytic reactor with all-radial flow of gas through the catalysts for purifying the exhaust gases from internal combustion engines e.g. of motor vehicles, and comprises a reactor body in the form of the frustum of a cylinder, provided at one end (the upstream end) with an inlet aperture for the engine exhaust gases arranged axially and an outlet aperture for the purified gases, provided or formed in the lateral surface of the cylindrical body close to its other extremity or end, the latter being entirely closed by a downstream end wall, and whose interior is divided into two cylindrical spaces which communicate through an axial aperture, each of the said cylindrical spaces being adapted to accommodate a corresponding catalytic bed, the first or upstream of which is arranged to be in the form of a hollow cylindrical body, aligned with the axis of the reactor, fixed to the top wall of the reactor, and closed inside by a bottom wall, the catalyst which is or will be disposed therein being a reducing catalyst, and the second or downstream space, comprising a structural hollow cylinder, and/or arranged so that the resistance to the efflux of gas is substantially uniform on its lateral surface, and adapted to contain an oxidising catalytic bed, means being provided for the supply of secondary air in a zone of the reactor chamber between the two catalytic beds, e.g. from two diametrically directed air supply tubes in that zone.

Some explanation of the problems and the more significant features by which these problems are resolved in the reactor of this invention is now given, in particular by reference to some structural features of the reactor. Particular importance is attached to the choice of the geometry of the section of the outlet from the second chamber housing the oxidising catalytic bed. Once a radial discharge path through the chambers has been selected for arriving at a more compact structure of reactor with the aforementioned advantages, the problem arises of a non-uniform distribution of the gas flow in the oxidising catalytic bed when arranged with its axis co-axial with the body of the reactor. In such a case there have in fact been found, at constant delivery, very considerable variations in the values of pressure in the space between the second catalyst chamber and the surrounding lateral casing (for instance, from 159 mm $H_2O$ at points fairly close to the exhaust discharge orifice, to 188 mm $H_2O$ at points 90° displaced from the orifice to values of the order of 200 mm $H_2O$ in the part of the space diametrically opposite the discharge orifice. To avoid this drawback, and at the same time to retain the advantages inherent in the use of radial flow of exhaust gas through the bed, a preferred expedient is to vary the width of the space between the second reactor chamber and the surrounding lateral wall such that the width is smallest remote from the discharge orifice and increases progressively towards the discharge orifice, so that in every region of the space, the value of the gas velocity passing therethrough is substantially the same. This leads to a substantially constant pressure drop between the point where the gas enters the second catalytic bed and each point of the exhaust section, thus avoiding the formation of preferential paths and promoting substantially radial flow of gas through the bed.

In this connection, in one preferred embodiment of the invention the distance ($S$) in centimeters between the outside of the side wall of the oxidising chamber and the inside of the lateral wall of the reactor has a value which varies as a function of the angular position, and capable of being expressed by the radio:

$$S = 0.5 + 1.3 \ (alpha/180)$$

in which alpha is the angle between the position of the radius opposite which $S$ is measured and that of the radius opposite the gas discharge mouth.

More generally, the distance $d$ between the second chamber and the surrounding lateral wall at an angle alpha from a radius to the discharge outlet is expressed by $$d = a + b \ (alpha/180)$$

where $a$ is the minimum distance between the periphery of the chamber and the lateral wall and $b$ is the offset or eccentric distance between the axes of the chamber and the reactor.

Instead of being eccentrically disposed relative to the reactor axis, the oxidising bed can, however be co-axially arranged while still avoiding the drawbacks referred to above, thus guaranteeing the uniformity of the radial discharge of the gas from the side wall of the oxidising bed, provided that holes of different sizes are made in the side or peripheral wall of the chamber, the smaller ones adjacent to the discharge aperture and the larger ones in the diametrically opposite position, with gradually variable dimensions of holes between these two extreme positions. In the event that the nature of the catalyst does not allow the use of an adequately large size to provide the required distribution of differently sized holes, it is possible to make, in the side or peripheral wall, holes of substantially uniform size which are spaced further apart near the discharge mouth and less spaced apart in the position diametrically opposite the exhaust gas discharge orifice.

The ratio between the diameter and the axial length of each chamber or bed is an important factor for obtaining the best combination of pressure drop, time of sojourn and uniformity of the distribution of the flow of gas in the catalytic beds. In the case of the oxidising bed the ratio between internal diameter and axial length can vary from 0.5 to 2.0 and is preferably about 0.9. In the case of the reducing bed, this ratio may be from 0.5–2.0 and is preferably about 1.7. When an oxidising chamber is used having holes of uniform dimension in the side or peripheral wall, the eccentricity of the reactor can be determined with the following expression.

$$S = 0.5 + 1.3 \text{ (alpha}/180)$$

A further structural characteristic of the reactor of the invention is its adaptability to the use of every type of catalyst, whether in pellets, monolithic blocks or in the form of mesh, and the ease with which it can be dismantled for inspection, replacement of catalyst or structural part, or repair.

Reference is now made to the attached drawings which illustrate, solely by way of example, a preferred form of the reactor according to the invention, and in which:

FIG. 1 is a schematic diagram of an automotive engine provided with a reactor assembly in accordance with the invention, FIG. 2 is a view in perspective, in partial section, along an axial plane of the reactor assembly of FIG. 1, shown to the larger scale, and FIG. 3 is a view in the direction indicated by the arrows AA of the reactor of FIG. 2.

Reference is first made to FIG. 1 which shows a 4-cylinder in-line gasoline engine of conventional design having an air intake cleaner 100, a carburetor venturi system 101 supplied with fuel from one or more jets 102, a throttle plate 103, an intake manifold 104, a cylinder block 105, an exhaust manifold 106, a reactor 1 according to the invention, an exhaust pipe 107, a silencer or muffler 108 and a tail pipe 109.

An exhaust gas recycle (EGR) conduit 110 is connected at one end to the exhaust pipe 107 between the reactor 1 and silencer 108, and at the other end to the intake tract between the carburetor system 101 and the throttle plate 103 so that exhaust gas can be employed to dilute the fuel charge passed to the engine. A valve 111 is provided in conduit 110 to regulate the EGR, and the control of the valve 111 may be dependent on, for example, the throttle plate position (as indicated by the dotted line 112) either directly by mechanical or equivalent linkages, or indirectly, so that exhaust gas is recycled only when the engine is operating in a mode between low power (e.g. idling) and high power.

The engine turns a crankshaft (not shown) in the conventional manner, and a pulley wheel 113 driven therefrom is employed to transmit rotation via a belt 114 to a pulley wheel 115 of an air pump 116. The air pump 116 supplies secondary air for the combustion of combustible material in the exhaust gases via pipe 117 which is connected to the reactor 1 as hereinafter explained.

Reference is now made to FIGS. 2 and 3 and there will be seen in FIG. 2 the catalytic reactor 1 the lateral wall of which is in the form of a truncated cylinder, closed at the top and bottom axial ends by the walls 2 and 3 respectively. The end wall 2 is provided with an axial mouth 4 for the admission of exhaust gases discharged from the engine. The interior of the body of the reactor 1 is divided by a baffle into two annular chambers (A) and (B) accommodated respectively beds of reducing catalyst 5 and oxidising catalyst (6). Between the two chambers (A) and (B) there is a gap 7 into which secondary air is injected from two diametrically opposite tubes 8 connected to the secondary air pipe 117 of FIG. 1. Moreover, immediately above the gap 7, two rows of concentric holes 9 and 10 are formed in the baffle so that secondary air will enter the gas stream above the baffle at right angles to the flow of gas. The reducing catalyst bed in chamber (A) is in the form of a hollow cylindrical body of metal mesh catalyst e.g. nickel-copper alloy mesh, closed at the bottom by a plate 12 and fixed at the top to the top plate 2 of the reactor by the threaded studs 13 extending between the plates 12 and 2. The second catalytic bed 6, the oxidising bed, is also in the form of a hollow cylindrical body 14 arranged in the chamber (B) of the reactor, fixed at the top by welding to an annular plate 15 and closed at the bottom at 16 by the bottom wall 3 of the body 1 of the reactor. The said hollow cylindrical body 14 is located off-center in relation to the axis of the reactor; as may be seen more clearly in FIG. 3, this arrangement gives rise to efflux spaces (D) around the body 14 of different widths, increasing with decreasing distance from a radial discharge aperture 17 in the lateral surface of the body 1 of the reactor. FIG. 2 shows the central axis 0 of the circular section of the body 1 of the reactor and the central axis $0^1$ of the hollow cylindrical body 14 of the oxidising catalytic bed 6. As already explained, this non-uniformity in the efflux width around the body 14 leads, with constant gas flow rate, substantially to equality of the values of the speed vectors in each section of the catalyst bed, thus substantially precluding the formation of preferential paths or of short circuiting through the catalyst bed 6.

The operation of the reactor illustrated in FIGS. 2 and 3 is simple and efficient: the engine exhaust gas (arrow $d$ in FIG. 2) penetrates the interior of the reducing catalyst of bed 11 and emerges radially (arrow $e$, FIG. 2), and after mixing with the secondary air at 7, 9 and 10 it passes (arrow $f$ in FIG. 2) into the second bed 14 of the oxidising catalyst 6 to emerge purified through the efflux section or area (D in FIG. 3) of variable area and with equal velocities (arrows $g$ in FIG. 3) and is discharged (arrow $h$ in FIG. 2) from the reactor through the discharge orifice 17.

In a test performed on a catalytic reactor of the invention installed on a vehicle of class 2000 lb (906 kg) as defined by the USA Federal procedure of 1975, the reducing catalyst was in the form of mesh of reinforced Cu-Ni alloy of the type known as Monel, and the oxidising catalyst in the form of refractory pellets in and on which platinum is deposited, the following emission figures were obtained, by subjecting the motor vehicle to the 1975 US Federal procedure.

|  | g/mile | 1976 Standard values g/mile |
|---|---|---|
| CO | 2.10 | 3.4 |
| HC | 0.18 | 0.41 |
| NO$_x$ | 0.19 | 0.40 |

It may be noted that the emission figures of the first column are very much lower than the standard figures programmes for 1976. It may thus be shown that the emission figures obtained by the reactor of the invention do not depart significantly from the figures sought by car manufacturers and which are equal to 50 percent of the obligatory standard figures.

The reactor used in the sample had the following dimensions:

| Oxidising bed | Dimensions (mm) |
|---|---|
| Inner diameter | 60 |
| Outer diameter | 140 |
| Length | 65 |
| Eccentricity | 7 |
| Reducing bed | |
| Inner diameter | 84 |
| Outer diameter | 140 |
| Length | 50 |
| Reactor | |
| Outer diameter | 193 |
| length | 137 |

The ratio of the volume of the reactor to the swept volume of the engine is preferably in the range 3.4:1 to 1:1.

For engines having swept capacities of up to 1.6 liters, the size of the reactor, using catalysts having 90 percent conversion (or more) up to space velocities of 100,000 Volumes gas/Volume catalyst/Hour, tends to be in the range 2.5 to 4.5 liters, preferably about 4 liters, and for engines of swept volume from 1.6 to 3.0 liters, the reactor volume tends to be in the range 3 to 6 liters, preferably 5.5 liters. These reactor volumes are the overall volumes of the reactor casing, and within the reactor casing, there is scope for varying the size of each of the two beds and for changing the catalyst in each bed.

Where the cylinders of an engine are arranged in two or more banks (as in a V-engine), it is preferred to provide a reactor for each bank, although in some instances, it may be convenient to provide a single reactor to receive exhaust gas from both (or all) banks.

The present invention has been described with particular reference to one specific embodiment, but it must be understood that modifications and variations may be made without thereby departing from the scope of the invention as defined by the following claims.

What is claimed is:

1. A reactor assembly for use in the purification of exhaust gas from an internal combustion engine comprising: two substantially cylindrical chambers arranged end-to-end with their adjacent ends spaced apart, said chambers surrounded by a lateral wall of cylindrical shape spaced apart from the outer walls of the chambers, the chambers being permeable to exhaust gas, an exhaust gas inlet disposed coaxially relative to the lateral wall at one end of the reactor adjacent the first chamber and arranged for directing exhaust gas to the interior of the first chamber whereby said gas will pass substantially radially through the first chamber to the space between the first chamber and the lateral wall, baffle means for directing exhaust gas from said space between the first chamber and the lateral wall to the interior of the second chamber whereby said exhaust gas will pass substantially radially through said chamber into the space between the second chamber and the lateral wall, there being an exhaust gas outlet in the lateral wall adjacent to the other end of the reactor communicating with the space between the second chamber and the lateral wall for discharge of the exhaust gas from the reactor, said space between the second chamber and the lateral wall being varied in width such that the width is smallest remote from the exhaust outlet in the lateral wall and the greatest at the region closest to the exhaust outlet in the lateral wall.

2. A reactor according to claim 1 in which the end of each chamber remote from the exhaust gas inlet is closed off to prevent gas flows through the chambers parallel to the axis of the reactor.

3. A reactor according to claim 2 in which at least one of the chambers is of annular form whereby exhaust gas enters said chamber from the cylindrical space surrounded by the annular chamber.

4. A reactor according to claim 3 in which the ratio of the internal diameter of the annular chamber to the axial length thereof is in the range of 0.5 to 2.0.

5. A reactor according to claim 4 in which the second chamber is so arranged and constructed that the resistance to flow therethrough is substantially uniform.

6. A reactor according to claim 1 in which the axis of the second chamber is offset from the axis of the reactor away from the exhaust outlet, and the walls defining the second chamber are of uniform permeability to gas flow.

7. A reactor according to claim 6 in which the distance $d$ from the periphery of the second chamber to the surrounding lateral wall is expressed by:

$$d = a + b \ (alpha/180)$$

where $a$ is the minimum distance between the periphery of the chamber and the lateral wall at locations remote from the outlet, $b$ is the offset distance between the axes of the chamber and the lateral wall, and alpha is the angle between a radius to the point at which the distance $d$ is measured and a radius to the center of the exhaust outlet.

8. A reactor according to claim 7 in which the first chamber is substantially coaxial with the reactor.

9. A reactor according to claim 8 comprising means for supplying air to a mixing space between the baffle means and the second reactor.

10. A reactor according to claim 9 in which the air supply means comprises at least one conduit terminating in a mixing space between the baffle means and the adjacent end of the second chamber, the conduit extending parallel to the reactor axis between the first chamber and the lateral wall.

11. A reactor according to claim 10 in which the baffle means is of substantially annular form and extends inwardly from the lateral wall, the central orifice of the baffle means serving to direct exhaust gas into the second chamber and having a plurality of orifices surrounding the central orifice for the passage of air from the mixing space to a space between the baffle means and the adjacent axial end of the first chamber.

12. A reactor for use in the purification of exhaust gas from an internal combustion engine comprising two substantially cylindrical chambers arranged end-to-end with their adjacent ends spaced apart, said chambers surrounded by a lateral wall of cylindrical shape spaced apart from the outer walls of the chambers, the chambers being permeable to exhaust gas, an exhaust gas inlet disposed coaxially relative to the lateral wall at one end of the reactor adjacent the first chamber and arranged for directing exhaust gas to the interior of the first chamber whereby said gas will pass substantially radially through the first chamber to the space between the first chamber and the lateral wall, baffle means for directing exhaust gas from said space between the first chamber and the lateral wall to the interior of the second chamber whereby said gas will pass substantially radially through said chamber into the space between the second chamber and the lateral wall, there being an exhaust outlet in the lateral wall adjacent to the other end of the reactor communicating with the space between the second chamber and the lateral wall for the discharge of exhaust gases from the reactor, said second chamber having orifices in the peripheral wall thereof, said orifices having progressively larger dimensions, the orifices with the smaller dimensions being adjacent to the exhaust outlet and the orifices of larger dimensions being in the diametrically opposite position whereby the radial discharge of the gas through said second chamber will be substantially uniform.

13. A reactor assembly for use in the purification of exhaust gas from an internal combustion engine comprising: a cylindrical casing having an upstream end and a downstream end; an inlet for exhaust gas at the upstream end of the casing and a gas outlet at the downstream end of the casing; two annular gas-treating chambers axially spaced apart within the casing, said annular gas-treating chambers having an upstream radial wall with a substantially central orifice therein and a solid downstream radial wall, said annular gas-treating chambers having cylindrical concentric gas-permeable inner and outer walls bounding the inner and outer sides of the chamber, said inner wall defining a central space for receiving gas which is to pass through the chamber and said outer wall defining with the casing a surrounding space for receiving gas which has passed through the chamber, one of said gas-treating chambers being disposed upstream in the casing to receive exhaust gas from the inlet and the other chamber being disposed downstream in the casing adjacent to the outlet; a baffle extending across the casing between the chambers and defining with each chamber a respective cylindrical space, said baffle having an orifice therethrough whereby gas is directed inwardly from the space surrounding the upstream chamber into the central space of the downstream chamber; and, means for supplying air to the cylindrical space between the baffle and the downstream chamber.

14. The apparatus of claim 13 wherein the axis of the second annular gas-treating chamber is offset from the axis of the cylindrical casing and wherein the gas-permeable walls of the chamber are uniformly permeable to gas flow.

* * * * *